INVENTORS.
KENJI ARIYASU
AKIRA TSUJI

3,513,052
METHOD OF FORMING A FILM PACKAGE

Kenji Ariyasu and Akira Tsuji, Kanagawa, Japan, assignors to Fuji Photo Film Co., Ltd., Nakanuma, Minami-Ashigara Machi, Ashigara-Kamigun, Kanagawa, Japan
Filed Apr. 10, 1968, Ser. No. 720,260
Claims priority, application Japan, Apr. 12, 1967, 42/30,656
Int. Cl. B32b *31/20;* B65d *33/22*
U.S. Cl. 156—251                                               1 Claim

ABSTRACT OF THE DISCLOSURE

A packagebag made of plastic film for packaging an article having enlarged beads formed in the periphery of the bag by melting the edge of the package film and sealed portions being formed in the inner edge of the beads.

BACKGROUND OF THE INVENTION

The present invention relates to film packagebags, and more particularly to a film packagebag in which airtight sealing of the bag is achieved.

Heretofore, various processes such as heat sealing, impulse sealing, heat weld sealing, supersonic sealing, high frequency sealing and adhesion sealing have been utilized for sealing the film packagebag depending upon the nature of the film of the bag, the shape of the article to be packaged, mechanical properties of the film required for packaging the article and the workability of the film.

Thermally contractable film which is in general difficult to thermally bond begins to contract at a temperature lower than the melting point of the film and, therefore, impulse sealing or bonding, supersonic sealing or heat weld sealing has been used for sealing such films.

Since pinholes for extracting air from the inside of the bag are generally provided in the packagebag made of thermally contractable film, such a bag cannot be said to be air-tight.

In case an article having greater thickness is packaged by bonding together the peripheries of the two films which sandwich the article, wrinkles occur in the corner portions of the packagebag, especially when the article has a sharp corner. Such wrinkles tend to cause pinholes in the bag when the bag is sealed by a heat weld sealing process, and also to cause incomplete sealing of the bag when it is sealed by impulse sealing, whereby destroying the sealing effect of the packagebag.

Since a tensile force occurs around the pinholes within the thermally contractable film when it begins to contract, the pinholes become much larger. It is important to achieve air-tight sealing of the packagebag with films having wrinkles in close contact with each other, especially when an article of box-like form is mechanically packaged by the films.

When the thermally contractable film is used for airtight packagebags, pinholes for extracting air therein must be naturally plugged, or sealing must be effected without providing pinholes.

Therefore, incomplete packages are often produced by bonding the films together having complicated wrinkles by the conventional sealing process or by a particular sealing process in which beads are formed. When the sealed packages are repeatedly produced, it is impossible to guarantee the reliable preservation of the article which must be isolated from moisture.

The present invention aims at avoiding the above-mentioned disadvantages of the prior art.

SUMMARY OF THE INVENTION

The present invention provides a novel and useful film packagebag in which swelled beads are formed at the periphery of the bag and sealing is effected along the inner edge of the beads so as to guarantee complete airtight sealing of the bag.

DETAILED DESCRIPTION OF THE PREFERRED EMBODIMENT

Figure 1:
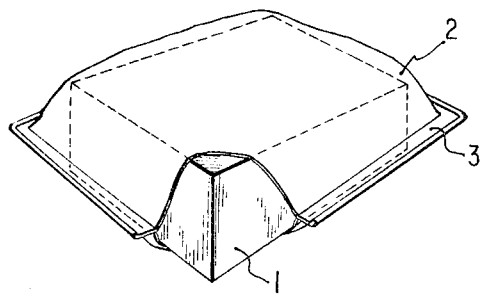
FIG. 1 is a perspective view showing the film packagebag constructed in accordance with the present invention, a portion thereof being broken away in order to show the article packaged therein.

In FIG. 1, article 1 is packaged in a film packagebag 2 in accordance with the present invention. Package bag 2 has a seal portion 3 at the edge thereof, which comprises sealed section 30 and beads 31 formed at the end of sealed section 30 by melting the film constituting the bag, so that a complete air-tight seal is effected.

Figure 2:
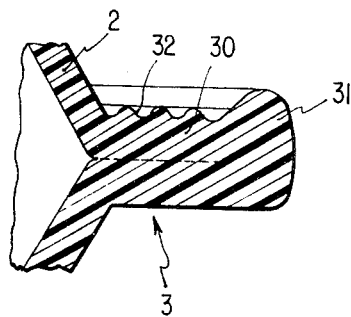
FIG. 2 is a fragmentary cross-sectional view showing the sealed portion of the bag in accordance with the present invention in magnified scale.

In this manner, the wrinkles 32 in the film can be substantially sealed as shown in FIG. 2 and the spaces in the film forming pinholes are compressed and air-tightly closed by beads 31 formed by melting the film.

Figure 3:
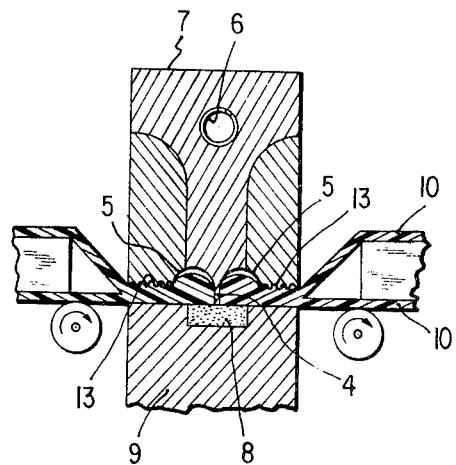
FIG. 3 is a side cross-sectional view showing an embodiment of the apparatus for forming the packagebag of the present invention.

In order to seal the packagebag in accordance with the present invention, beads 31 are first formed, and then the inner edge 30 is sealed. Alternatively, a heat weld sealing apparatus as shown in FIG. 3 may be used. This apparatus comprises heat cutting blade 4 and pressing sealing surfaces 13 located at either side of said heat cutting blade 4, said pressing sealing surfaces 13 being made of a material having a thermal conductivity less than that of said heat cutting blade 4. As shown, blade 4 protrudes beyond sealing surfaces 13. The temperature of sealing surfaces 13 is adjustable. Thermally insulating layers are provided between sealing member 7 carrying heater 6 therein and cutting blade 4, and each of the members carrying sealing surfaces 13.

Grooves 5 are formed between said blade 4 and each of said sealing surfaces 13, said grooves serving to hold beads 31 formed by melting the film. Shock absorbing member or bumper 8 of heat resisting material is embedded in stationary base 9. The bumper 8 serves to cut off the two beads formed simultaneously by the sealing apparatus acting in cooperation with cutting blade 4.

Since the packagebag constructed in accordance with the present invention has superior sealing effects as described above, it is suitable for packaging articles such as dried food, chemicals, medicines or photosensitive materials which must be isolated from moisture. Further, the packagebag in accordance with the present invention has sufficient mechanical strength for packaging an article having greater weight which cannot be appropriately packaged in prior art film packagebags. Thus, a packagebag formed in accordance with the present invention can be used for various purposes.

The present invention is not to be limited to the particular embodiment as described above and shown in the drawings, but it is to be understood that the present invention includes broad concepts of the present invention as defined in the appended claim.

What is claimed is:

1. A method of forming a plastic film package comprising: heating a body having a cutting blade of relatively high thermal conductivity and a pressing surface adjacent thereto of lower thermal conductivity, and simultaneously pressing said heated body against adjacent layers of film on a shock absorbing member with said pressing surface interiorly of said cutting blade to form an enlarged bead of film material adjacent said cutting blade, and a compressed seal portion interiorly of said bead and further comprising the steps of moving said heated cutting blade into contact with said shock absorbing member to sever said film layers while maintaining said shock absorbing member spaced from said pressing surface.

References Cited

UNITED STATES PATENTS

| | | | |
|---|---|---|---|
| 2,749,020 | 6/1956 | Baxter | 229—53 |
| 3,204,760 | 9/1965 | Whiteford | 206—46 |

DAVID M. BOCKENEK, Primary Examiner

U.S. Cl. X.R.

206—46; 229—53, 62